Patented Aug. 7, 1934

1,969,636

UNITED STATES PATENT OFFICE 1,969,636

ADHESIVE

Gardner R. Alden, Framingham, Mass., assignor to Dennison Manufacturing Company, Framingham, Mass., a corporation of Massachusetts No Drawing. Application September 8, 1931,
Serial No. 561,703

16 Claims. (Cl. 216—62)

REISSUED

This invention relates to adhesives and to a method of joining together two or more surfaces therewith.

In the art of making and applying adhesives, a considerable number of the compositions heretofore used rely upon water as the solvent vehicle, others depend upon the application of heat to make them liquid, and with some both water and heat are employed. While generally useful, such compositions are inadequate or inconvenient for many purposes and may positively fail to wet or adhere to certain types of surfaces. Moreover, certain of them are more or less subject to weather conditions, becoming sticky in damp weather, which causes premature adhesion, and drying to brittleness when kept in dry places.

A typical and unusually exacting application of adhesives is found in the sealing of packages wrapped with smooth sheet-cellulose materials and especially with transparent sheets of this material, such as cellophane which has been treated to render it moisture-proof (e. g. with a base, a gum or resin, a wax or wax-like material and a plasticizer, as disclosed in U. S. Patent 1,737,187 Nov. 26, 1929, to W. H. Charch et al. or du Pont "waterproof" or "moisture-proof" cellophane No. 300). Such surfaces are so smooth and so resistant to water that they are not wetted by the usual water soluble adhesives, which accordingly fail to have any appreciable adhesive effect.

An object of this invention, therefore, is to provide a class of adhesive compositions and coatings which preferably are not rendered adhesive or tacky by the atmosphere and a method for the application of the same, especially to smooth surfaces (such as waterproof cellophane) which are not wetted freely by the adhesives now available. Further objects of the invention will appear from the following disclosure.

A part of the invention includes the preparation of a potentially adhesive solution or suspension of shellac and/or other resinous materials or gums, preferably contained in a volatile organic solvent, forming a solution of suitable viscosity and having the property of drying to form a firm, non-sticky, but preferably flexible surface.

Another part of the invention provides a liquid solvent or vehicle suitable for moistening the dried adhesive composition to render it immediately sticky or tacky, but preferably without extreme degree of fluidity or liquidity. To t? is end the moistening liquid preferably contains a liquid of high boiling point (which is slow.y volatile or non-volatile) thereby to contribute a more or less permanent plasticity to the gummy composition as well as a temporary stickiness while adhesion is being effected.

The application of the invention accordingly includes the preliminary step of preparing an adhesive composition, typically a solution or suspension of hard and/or soft gums and a specific adhesive, such as shellac, in a suitable solvent vehicle comprising one or more volatile organic solvents. The composition may then be applied in the usual way to one or both of the surfaces to be joined. The surfaces may be brought together at this stage. For most purposes, however, such as labels, it is desirable to dry the gummed surface and leave it in this condition until it is to be used. In this case, the coating is allowed to dry (which is effected quickly) and the gummed surface will keep indefinitely without sticking or deterioration, unless exposed to high temperature. When required for use, it may be moistened with a suitable solvent vehicle, typically of high boiling point and adapted to serve as a plasticizer. The moistening agent may be controlled, in its softening and penetrating effects, by the addition of an inert non-solvent liquid which is preferably freely miscible therewith, such as water. A non-solvent liquid may also be employed to serve as a plasticizer. The thus prepared surface and the surface to be joined are then contacted and pressed together, and the adhesive connective layer permitted to dry and set.

A preferred instance of the practical application of the invention will be described with respect to the adhesive joining surfaces of cellophane which have been rendered waterproof, either to unlike surfaces or to other surfaces of the same material.

For this purpose, it is found that a solution of shellac manifests specific properties of adhesion to cellulosic materials, and is especially recommended as one ingredient of the composition to which may be added a soft gum to impart plasticity (such as gum elemi) and a viscosity increasing agent (such as gum copal) to improve the strength and spreading characteristics of the composition. These are compounded as by dissolving in a suitable amount of a freely volatile organic liquid (such as toluol and alcohol) to a freely spreading liquid consistency.

Thus, the various materials may be first separately dissolved as follows:

| No. 1 | No. 2 | No. 3 |
|---|---|---|
| 22 lbs. copal.<br>15 lbs. toluol.<br>4 lbs. alcohol. | 25 lbs. elemi.<br>6 lbs. toluol.<br>1½ lbs. alcohol. | 20.5 lbs. shellac.<br>35.0 lbs. alcohol. | and the resulting solutions mixed in appropriate quantities, such as in the amounts stated, produce a substantially transparent composition.

The composite solution thus produced may be spread in a uniform, thin layer upon a sheet of paper for example, in any usual way, and then dried. The gummed sheet thus obtained has a firm, hard surface, which is not affected by moisture to become tacky or sticky, and which at the same time does not become brittle or hard so as to crack or leave the coated surface. Accordingly the gummed sheets may be piled one upon another without adhesion or solidifying of the mass and labels or the like may be cut out, embossed, printed, etc., without difficulties of this sort.

The shellac, when applied alone, may be satisfactorily employed with the moistening solution described below, but the addition of the soft gum elemi (which may be in part or wholly replaced by a similar permanently soft gum such as soft gum copal) imparts plasticity to the dried deposit, while the gum copal (especially if a hard copal is used) increases viscosity of the solution and tenuity of the applied liquid film, during spreading.

The solvents named are preferable, in that they avoid the disadvantages of certain other organic solvents, such as the toxicity of benzol, and at the same time are freely fluid and rapidly volatile. These are especially advantageous features when a dried gummed surface is required as in making gummed labels and the like. But other solvents exhibiting these properties may be selected from the wide range of organic solvents now available and applicable to this purpose.

When ready for use, as for example in the application of the labels to cellophane wrappings, the gummed surface is wet with the moistening solution, the solvent or penetrating effect of which may be modified by the addition of water. An especially satisfactory solution for this purpose may be prepared as follows:

IV. Moistening solution

| | Per cent |
|---|---|
| Butyl cellosolve (Butyl ether of ethylene glycol B. P. 165-173° C.) | 50 |
| Water | 50 |

Small quantities of other high boilers or plasticizers can likewise be used.

This softens the gumming layer but does not dissolve it sufficiently to form a solution which will penetrate through and soak into the body stock of the label. On the other hand, it wets and softens the waterproofed cellophane surface and thus helps to effect a union between the two surfaces to be joined as they are brought together in pressure contact.

The water of the moistening solution gradually dries out, but the high boiling solvent plasticizer vehicle remains, in liquid condition, and thus preserves a certain degree of softness and flexibility in the connective adhesive layer which prevents subsequent embrittling of the label, and hence promotes permanent and firm adhesion between the two surfaces.

While the adhesive composition will, in perhaps its most common application, be applied to sheet materials such as labels of paper or cloth, it may likewise be applied to surfaces which are not usually wetted by water such as waterproof cellophane above mentioned or other cellulosic compositions, or even to metal surfaces such as aluminum foil, or to surfaces generally which are not wetted by water but which are wetted by the solvent and plasticizer liquids employed, such as cellulose esters and ethers.

The resinous materials, also, while preferably containing shellac, may also include manila copal, dammar gum and synthetic resins, and may be employed severally but preferably in admixtures of two or more.

The plasticizers may be either high boiling point solvents of the resinous material or materials employed, or non-volatile miscible liquids, and include the glycerol esters of fatty acids, castor oil, and linseed oil. Appropriate solvents may be used which serve additionally to wet and to soften the surface to which the adhesive is to be applied.

For example, in given cases, other gumming compositions within the purview of the invention may be made up as follows:

| Gum copal or | 28 parts gum copal |
|---|---|
| Shellac | 22½ parts shellac |
| Gum elemi | 10 parts castor oil |
| (Castor oil) | 6½ parts toluol |
| | 33 parts denatured alcohol | and applied in the usual way,—the resulting coating being wetted with moistening solutions such as:

| Alcohol | Alcohol |
|---|---|
| Toluol | Toluol |
| Tricresyl phosphate | Butylphthalate |

Again a solution of the copal or shellac alone may be applied and then dried and moistened with a moistening solution of the following composition (although this procedure is not preferred):—

Monobutylether of ethylene glycol (alone for shellac) or 75 parts monobutylether of ethylene glycol, 25 parts castor oil and/or 30 parts water (for copal).

Likewise other solutions may be prepared and used for moistening the adhesive compositions, as follows:—

| | Parts |
|---|---|
| Butylether of ethylene glycol | 40 |
| Alcohol | 20 |
| Water | 40 |

| | Parts |
|---|---|
| Alcohol | 40 |
| Butanol | 10 |
| Toluol | 30 |
| Castor oil | 20 |
| Butylphthalate | 15 |

Monoethyl ether of ethylene glycol
Monobutyl ether of ethylene glycol
Monoethyl ether of diethylene glycol Monobutyl ether of diethylene glycol
Monoethyl ether of diethylene glycol
Monoethyl ether of ethylene glycol Monobutyl ether of ethylene glycol
Water
Diethylene glycol
Triethanolamine And similar moistening solutions may be prepared and used which are typically composed of non-volatile solvents and/or plasticizers of the gumming composition, in miscible vehicles or volatile solvents thereof, and which may also be adapted freely to wet and/or soften the surface to be attached thereto,—such as the waxy, resinous or paraffined, water-resisting surfaces characterized by waterproof cellophane as above alluded to.

It is to be understood that the adhesive composition, in each case, may be applied to either or both of the surfaces to be joined and may be immediately applied (if desired) or dried and subsequently wetted with the moistening solution and then applied, or the moistening solution alone may be applied to one surface and the adhesive composition applied to the other and dried before effecting contact.

It may be further observed that, either simultaneously with the initial application of the adhesive composition or subsequently thereto—(and either with or without complete drying of the same)—the composition may be rendered plastic by the application of heat and pressed or molded to such conformation as may be desired. Such heating may be partly or wholly relied upon to develop the adhesiveness of the composition, thus dispensing with the necessity of adding the moistening solution,—or may be so regulated as to affect the plasticity only.

For example, a sheet of cellophane or other sheet material to which the adhesive composition has been applied may be molded by light compression, or embossed, or otherwise shaped and molded, in usual ways. For example, embossed adhesive labels may be so made. On the other hand, the coated sheet may be allowed to dry (with or without effecting adhesion to another surface) and the whole heated later on to a sufficient degree to soften the composition, whereupon the sheet or sheets may be shaped as desired and subsequently hardened by cooling. Again the coated and dried sheet may be heated sufficiently to render the coating adhesive and then applied to another surface to which it readily adheres, or simultaneously heated and applied, and remains securely attached, upon cooling and hardening.

It should be understood that the present disclosure is for the purpose of illustration only and that this invention includes all modifications and equivalents which fall within the scope of the appended claims.

I claim:

1. Method of joining two surfaces together, comprising the steps of applying to one of said surfaces an adhesive fluid composition containing shellac in a volatile liquid vehicle, drying, and moistening with a moistening solution containing a solvent and a plasticizer.

2. A method of joining two surfaces together by adhesion, comprising the steps of applying to one of said surfaces an adhesive fluid composition containing shellac and a gum, in a volatile liquid vehicle, drying, and moistening with a moistening solution containing a solvent and a plasticizer.

3. A method of joining two surfaces together by adhesion, comprising the steps of applying to one of said surfaces an adhesive fluid composition containing shellac and a gum, in a volatile liquid vehicle and a liquid of high boiling point as a plasticizer.

4. A method of joining two surfaces together by adhesion, comprising the step of applying to one of said surfaces an adhesive fluid composition containing shellac, a hard gum and a soft gum, in a volatile liquid vehicle, and a liquid of high boiling point as a plasticizer.

5. A method of joining two surfaces together by adhesion, comprising the steps of applying a coating of shellac and a gum to one of said surfaces, and then moistening with a liquid containing a softening agent with respect to the other surface, and contacting the second surface therewith.

6. A method of joining two surfaces together by adhesion, comprising the step of applying to one of said surfaces a solution or suspension containing shellac and gum elemi in a volatile liquid vehicle.

7. A method of joining two surfaces together by adhesion, comprising the step of applying to one of said surfaces a solution or suspension containing shellac, and gum elemi and gum copal in a volatile liquid vehicle.

8. A method of joining two surfaces together by adhesion, comprising the steps of applying to one of said surfaces a solution or suspension containing shellac and a volatile liquid vehicle, drying, and subsequently applying thereto a moistening liquid containing butyl ether of ethylene glycol.

9. A method of joining two surfaces together by adhesion, comprising the steps of applying to one of said surfaces a solution or suspension containing shellac, and a volatile liquid vehicle, drying, and subsequently applying thereto a moistening liquid containing butyl ether of ethylene glycol, and water.

10. A method of joining two surfaces together by adhesion, comprising the steps of applying to one of said surfaces a solution or suspension containing shellac, and a volatile liquid vehicle, drying, and subsequently applying thereto a moistening liquid containing butyl ether of diethylene glycol, and water.

11. A method of joining two surfaces together by adhesion, comprising the steps of applying to one of said surfaces a solution or suspension containing shellac, and a volatile liquid vehicle, drying, and subsequently applying thereto a moistening liquid containing ethyl ether of ethylene glycol, and water.

12. A method of labeling which comprises placing a water insoluble resinous material upon the back of a label, drying said material, moistening the said dried material with a plasticizer solution and then applying the label.

13. A method of adhesively attaching a paper label to a sheet of cellophane, which comprises coating the back of the label with a solution of a resinous material in a volatile solvent, permitting the solvent to evaporate, moistening the residual resinous layer with a solution of a plasticizer in a volatile solvent, and applying the moistened label to a sheet of cellophane.

14. A method of labeling which comprises placing a water insoluble resin containing shellac upon the back of a label, drying said material, moistening the said dried material with a plasticizer solution and then applying the label.

15. A method of adhesively attaching a paper label to a sheet of waterproof cellophane which comprises coating the back of the label with a solution of a resinous material in a volatile solvent, permitting the solvent to evaporate, moistening the residual resinous layer with a solution of a plasticizer in a volatile solvent and applying the moistened label to a sheet of waterproof Cellophane.

16. A method of adhesively attaching a paper label to a sheet of waterproof cellophane which comprises coating the back of the label with a solution of a resinous material containing shellac in a volatile solvent, permitting the solvent to evaporate, moistening the residual resinous layer with a solution of a plasticizer in a volatile solvent and applying the moistened label to a sheet of waterproof cellophane.

GARDNER R. ALDEN.